United States Patent [19]
Iwatsuki et al.

[11] Patent Number: 4,785,689
[45] Date of Patent: Nov. 22, 1988

[54] FAILSAFE SYSTEM IN AUTOMATIC TRANSMISSION

[75] Inventors: Kunihiro Iwatsuki; Yoshio Shindo, both of Toyota, Japan

[73] Assignee: Toyota Jidosha Kabushiki Kaisha, Aichi, Japan

[21] Appl. No.: 945,483

[22] Filed: Dec. 23, 1986

[30] Foreign Application Priority Data

Dec. 24, 1985 [JP] Japan .................................. 60-291459

[51] Int. Cl.⁴ .............................................. B60K 41/06
[52] U.S. Cl. ...................................... 74/866; 74/867; 192/30 W
[58] Field of Search ................. 74/866, 867, 862, 865, 74/856; 192/30 W

[56] References Cited

U.S. PATENT DOCUMENTS

| | | | |
|---|---|---|---|
| 3,937,108 | 2/1976 | Will | 74/866 |
| 4,331,046 | 5/1982 | Leonard et al. | 74/867 |
| 4,393,732 | 7/1983 | Suzuki et al. | 74/866 |
| 4,414,863 | 11/1983 | Heino | 74/866 |
| 4,506,564 | 3/1985 | Coutant | 74/865 X |

FOREIGN PATENT DOCUMENTS

| | | | |
|---|---|---|---|
| 2125178 | 11/1972 | Fed. Rep. of Germany | 192/30 W |
| 136415 | 7/1979 | Fed. Rep. of Germany | 192/30 W |
| 36611 | 3/1980 | Japan | 74/866 |
| 49450 | 5/1981 | Japan | 74/866 |
| 49447 | 5/1981 | Japan | 74/866 |
| 173647 | 10/1982 | Japan | 74/866 |
| 9356 | 1/1984 | Japan | 192/30 W |
| 11753 | 1/1985 | Japan | 74/866 |
| 92931 | 5/1985 | Japan | 192/30 W |
| 2084673 | 4/1982 | United Kingdom | 74/866 |

Primary Examiner—Leslie A. Braun
Assistant Examiner—Dwight G. Diehl
Attorney, Agent, or Firm—Parkhurst, Oliff & Berridge

[57] ABSTRACT

A failsafe system in an automatic transmission includes: a device for detecting rotary speed of an output shaft of the automatic transmission; a device for detecting either rotary speed of a rotary member other than the output shaft of the automatic transmission or engine rotary speed. When a correlation between the output shaft rotary speed and either the rotary speed of the rotary member or the engine rotary speed is abnormal, control oil pressure in a hydraulic control device of the automatic transmission is increased, whereby slippage in frictionally engaging devices in the hydraulic control device of the automatic transmission during non-shift are effectively eliminated.

8 Claims, 9 Drawing Sheets

| SHIFT POSITION | | C1 | C2 | C0 | B1 | B2 | B3 | B0 | F1 | F2 | F0 |
|---|---|---|---|---|---|---|---|---|---|---|---|
| P | | | | ○ | | | | | | | |
| R | | | ○ | ○ | | | ○ | | | | |
| N | | | | ○ | | | | | | | |
| D | 1 | ○ | | ○ | | | | | | ◎ | ◎ |
| D | 2 | ○ | | ○ | | ○ | | | ◎ | | ◎ |
| D | 3 | ○ | ○ | ○ | | ○ | | | | | ◎ |
| D | 4 | ○ | ○ | | | ○ | | ○ | | | |
| 2 | 1 | ○ | | ○ | | | | | | ◎ | ◎ |
| 2 | 2 | ○ | | ○ | ○ | ○ | | | ◎ | | ◎ |
| 2 | 3 | ○ | ○ | ○ | | ○ | | | | | ◎ |
| L | 1 | ○ | | ○ | | | ○ | | | ◎ | ◎ |
| L | 2 | ○ | | ○ | ○ | ○ | | | ◎ | | ◎ |

FAILSAFE SYSTEM IN AUTOMATIC TRANSMISSION

BACKGROUND OF THE INVENTION

This invention relates to a failsafe system in an automatic transmission.

Vehicle automatic transmissions having a gear shift mechanism, a plurality of frictionally engaging devices and a hydraulic control device to selectively engage the frictionally engaging devices to set various gear stages are well known in the art.

The conventional frictionally engaging device is comprised of two sets of relatively rotatably friction plate elements and a hydraulic servo device for driving the friction plate elements. When oil pressure is fed to the hydraulic servo device, the two sets of the friction plate elements are strongly urged together, so that the friction plate elements frictionally engage with sufficient force to transmit torque therebetween.

The lower limit for the control oil pressure to the frictionally engaging device of the type described is the pressure wherein:

(1) all of the gear stages in all of the shift positions can be achieved irrespective of engine load (an engine output), vehicle speed or the like, i.e. the pressure giving rise to a torque capacity which precludes slippage of the frictionally engaging devices during non-shift running:

(2) the pressure giving rise to a torque capacity resulting in completion of shifting within a predetermined period of time so as not to damage the frictionally engaging devices during shifting from excess slippage.

In general, the working oil pressure to the frictionally engaging devices is a line pressure. In view of the above-described lower oil pressure limits, line pressure has heretofore been controlled in accordance with a value normally regarded as typifying an engine load, such as, for example, engine throttle opening. More specifically, the control is carried out such that line pressure increases with increasing engine loads.

In prior art devices, a throttle pressure related to the throttle opening is introduced into a control port of a primary regulator valve to control the line pressure. This throttle pressure has been generated by a throttle valve, to which a resilient force increasing with accelerator pedal depression is applied. In recent years, electronically-driven automatic transmission have been developed, whereby essential portions of the control circuit implement electronic circuitry. In the electronically-driven automatic transmissions of this type, information on the throttle opening is processed in the form of an electric signal, whereby the line pressure is controlled in response to an electric signal relating to the throttle opening (For example, in Japanese Utility Model Kokai (Laid-Open) No. 125555/1981).

When it becomes possible to control the line pressure or the throttle pressure by a command from a computer as described above, highly detailed control can be carried out as suggested in a related Japanese Patent Application No. 263131/1985 (filing date: Nov. 22, 1985) for example. More specifically, during non-shift running, the line pressure can be lowered as much as possible in accordance with engine load, vehicle speed and the like, with an appropriate extra margin of safety being kept, to thereby avoid wasteful powerloss suffered by a pump (precise control of a condition 1) for determining the lower limit of the aforesaid control oil pressure.

However, when control oil pressure given to the frictionally engaging devices is controlled by a command from a computer in response to input signals from the various sensors as described above, if there occur malfunctions in a sensor system, short-circuits in the sensor system and a computer input system, unexpected leakage of oil pressure in a hydraulic control device of the automatic transmission, unexpected rise in engine output, and the like, then slips occur in the frictinally engaging devices, whereby the gear stage cannot be suitably maintained, thus possibly deteriorating durability of the frictionally engaging devices.

SUMMARY OF THE INVENTION

The present invention has been developed to obviate the above-described disadvantages of the prior art and has its object the provision of a failsafe system in an automatic transmission, wherein, even if such unexpected situations as described above occur, control oil pressure in the hydraulic control device can be raised rapidly to a suitable value and durability of frictionally engaging devices can be secured and improved.

Figure 1:
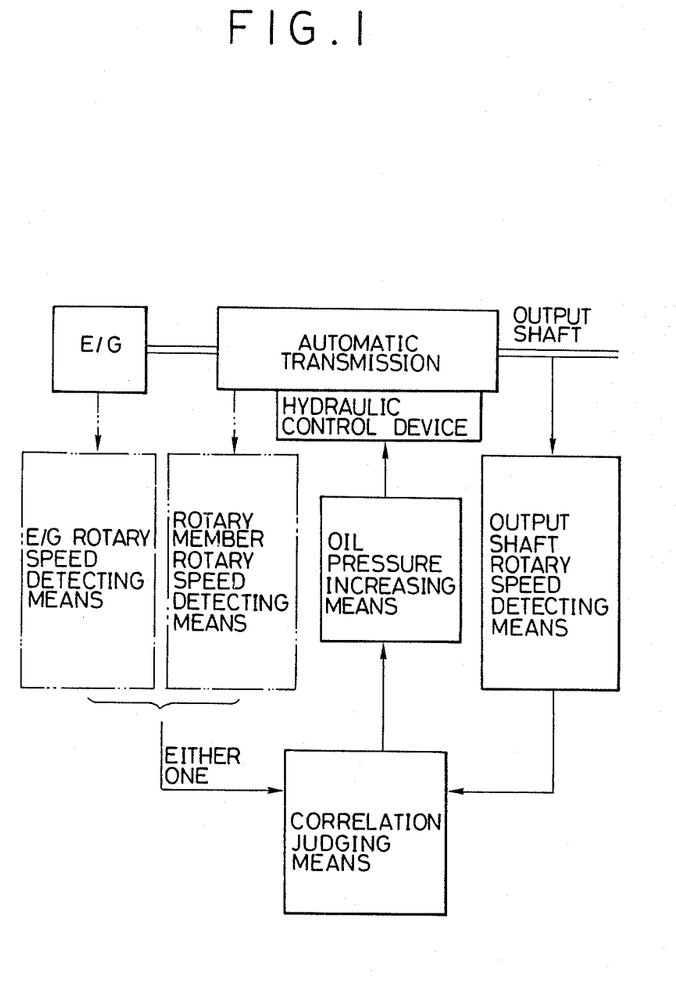
FIG. 1 is a block diagram showing the technical illustration of the present invention.

To achieve the above-described object, as the technical illustration thereof is shown in FIG. 1, the present invention detects rotary speed of an output shaft of the automatic transmission and detects either rotary speed of a rotary member other than the output shaft of the automatic transmission or engine rotary speed. Further, the present invention judges normality or abnormality of a correlation between the rotary speed of the output shaft and the rotary speed of above rotary member, or between the rotary speed of the output shaft and the engine rotary speed. The correlation is defined in association with a gear ratio of a gear stage of the automatic transmission. When the correlation is judged to be abnormal, oil pressure in the hydraulic control device of the automatic transmission is increased.

According to the present invention, when the correlation is abnormal, i.e. the frictionally engaging devices are slipping, whereby the correlation therebetween is shifted from the relationship which should properly be, the oil pressure in the hydraulic control device of the automatic transmission is increased. As a result, even when the control oil pressure is lowered due to a trouble in the sensor system or the like, whereby slips occur in the frictionally engaging devices, this situation is rapidly detected, so that the proper state can be rapidly restored. Consequently, deteriorated durability of the frictionally engaging devices can be avoided and more stabilized running can be performed.

The preferred embodiment is of such an arrangement that the oil pressure in the hydraulic control device is the line pressure. This is because the oil pressure acting on the frictionally engaging devices during non-shift running is basically dependent upon the line pressure.

Furthermore, it is preferable that the oil pressure in the hydraulic control device is increased by the control of an electromagnetic proportion valve. Or, the oil pressure in the hydraulic control device is increased by the duty control. For the control of the electromagnetic proportion valve or the duty control itself, well known means is adoptable.

Furthermore, it is preferable that, when the correlation is shifted by a predetermined value or more, the correlation should be judged to be abnormal. With this arrangement, errors in a detecting system can be absorbed.

Furthermore, it is preferable that, when the correlation is shifted larger than the predetermined value for a predetermined period of time, the correlation should be judged to be abnormal. With this arrangement, such a misjudgment that an instantaneous shift in the correlation is erroneously attributed to the slips of the frictionally engaging devices can be avoided.

Furthermore, it is preferable that, when the correlation is judged to be abnormal, a warning is issued. With this arrangement, a driver is informed that the failsafe function according to the present invention is performing, and rapid inspection and the like can be urged.

Furthermore, it is preferable that the correlation is judged when the engine load is higher than a predetermined value.

Furthermore, it is preferable that the correlation is judged when a lockup clutch is engaged.

Furthermore, it is preferable that the correlation is judged after a lapse of a prescribed period of time from either a shift judgment or a shift command.

Judgment of failsafe need not necessarily be made for the entire period of time, and, malfunction of the failsafe function is avoided more often when the correlation can be more steadily grasped. As a consequence, from this point of view, for example, judgment of the correlation may preferably be made when the engine load is higher than a predetermined value (when no engine brake is operating), the lockup clutch is engaged, and after a lapse of a prescribed period of time from either a shift judgment or a shift command.

BRIEF DESCRIPTION OF THE DRAWINGS

The above object, features and advantages of the present invention, as well as other objects and advantages thereof, will become more apparent from the description of the invention which follows, taken in conjunction with the accompanying drawings, wherein like reference characters designate the same or similar parts and wherein.

DESCRIPTION OF THE PREFERRED EMBODIMENTS

The present invention, which can be illustrated by FIG. 1, will be described in detail with reference to other accompanying drawings which illustrate preferred embodiments of the present invention.

Figure 2:
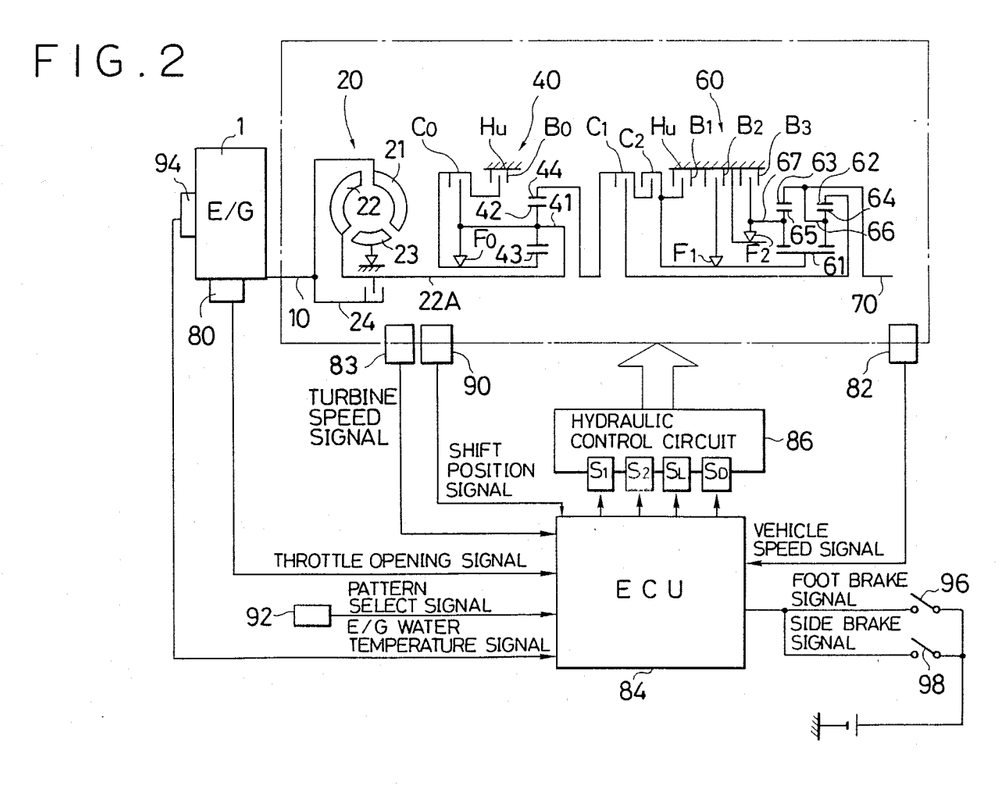
FIG. 2 is a skeleton diagram showing the general arrangement of the automatic transmission, to which one embodiment of the failsafe system of the automatic transmission for a vehicle according to the present invention is applied.

FIG. 2 shows the outline of the general arrangement of the automatic transmission for a vehicle to which this embodiment is applied.

The automatic transmission includes a torque converter 20, an overdrive mechanism 40 and an underdrive mechanism 60 including three forward gear stages and one reverse gear stage.

The torque converter 20 is of a type well known in the art, and includes a pump 21, a turbine 22, a stator 23 and a lockup clutch 24. The pump 21 is connected to a crankshaft 10 of an engine 1. The turbine 22 is connected to a carrier 41 of planetary gear trains in the overdrive mechanism 40 through a turbine shaft 22A.

In the overdrive mechanism 40, a planetary pinion 42 rotatably supported by carrier 41 is in meshing engagement with a sun gear 43 and a ring gear 44. A clutch C0 and a one-way clutch F0 are provided between the sun gear 43 and the carrier 41. A brake B0 is interposed between the sun gear 43 and a housing Hu.

The underdrive mechanism 60 is provided with front and rear planetary gear trains. The two planetary gear trains include a common sun gear 61, ring gears 62 and 63, planetary pinions 64 and 65, and carriers 66 and 67.

The ring gear 44 in the overdrive mechanism 40 is connected to the ring gear 62 through a clutch C1. A clutch C2 is interposed between the ring gear 44 and the sun gear 61. The carrier 66 is connected to the ring gear 63. The carrier 66 and the ring gear 63 are connected to an output shaft 70.

A brake B3 and a one-way clutch F2 are interposed between the carrier 67 and the housing Hu. A brake B2 and a one-way clutch F1 are provided between the sun gear 61 the housing Hu. A brake B1 is interposed between the sun gear 61 and the housing Hu.

Figure 3:
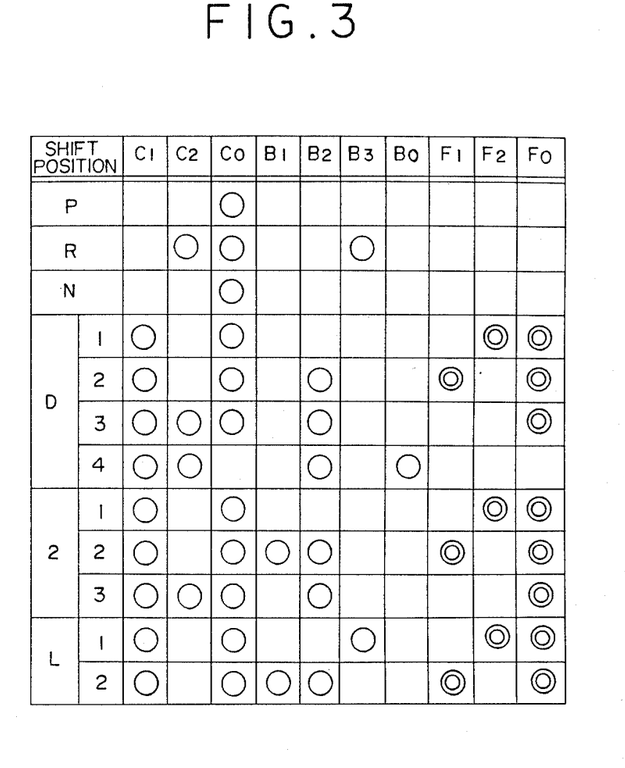
FIG. 3 is a chart showing the operating conditions of the frictinally engaging devices in the above automatic transmission.

The automatic transmission of this embodiment is provided with a computer (ECU) 84 receiving input signals from a throttle sensor 80 for detecting a throttle opening reflecting a load of the engine 1, from a vehicle speed sensor 82 for detecting a vehicle speed, and a from a turbine sensor 83 for detecting rotary speed of turbine shaft 22A, and the like. Computer 84 controls solenoid valves S1 and S2 (for controlling shift valves), solenoid valve SL (for controlling the lockup clutch) and an electromagnetic proportion valve SD (for controlling the line pressure) in a hydraulic control device 86 in accordance with a preset shift map. As a result, combinations of engagements between the clutches, the brakes and the like as shown in FIG. 3 are performed to thereby carry out shift controls. In FIG. 3 marks O indicate engaged conditions and marks ⊙ indicate engaged conditions only when no engine brake is operating.

Figure 4:
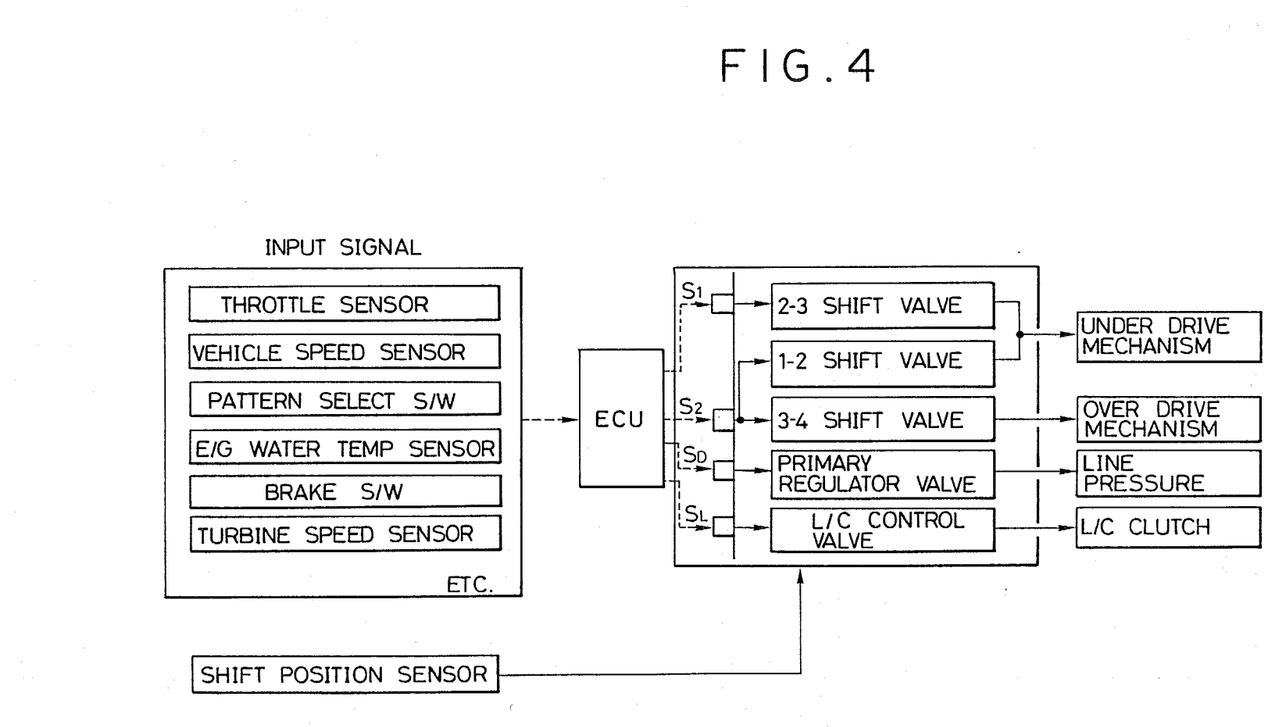
FIG. 4 is a chart showing the input and output relationship of the control system.

As shown in FIG. 4, the solenoid valve S1 controls a 2-3 shift valve. The solenoid valve S2 controls a 1-2 shift valve and a 3-4 shift valve. The 1-2 and the 2-3 shift valves perform the shift-control from 1st gear stage to 3rd gear stage in the underdrive mechanism 60. The 3-4 shift valve performs the shift-control in the overdrive mechanism 40 (shifts between 3rd gear stage and 4th gear stage). The solenoid valve SL performs the control of a lockup clutch 24 in the torque converter 20 through a lockup relay valve. The electromagnetic proportion valve SD performs the control of the line pressure in the hydraulic control device 86 through a primary regulator valve (described below).

Additionally, in FIG. 2, designated at 90 is a shift position sensor to detect the selected shift position (e.g., N, D, R and the like), 92 is a pattern select switch to select E (economical running), P (power running) or the like, 94 is an engine water temperature sensor to detect the water temperature of the engine, 96 is a foot brake switch to detect foot brake actuation, and 98 is a brake switch to detect side brake actuation, respectively.

Figure 5:
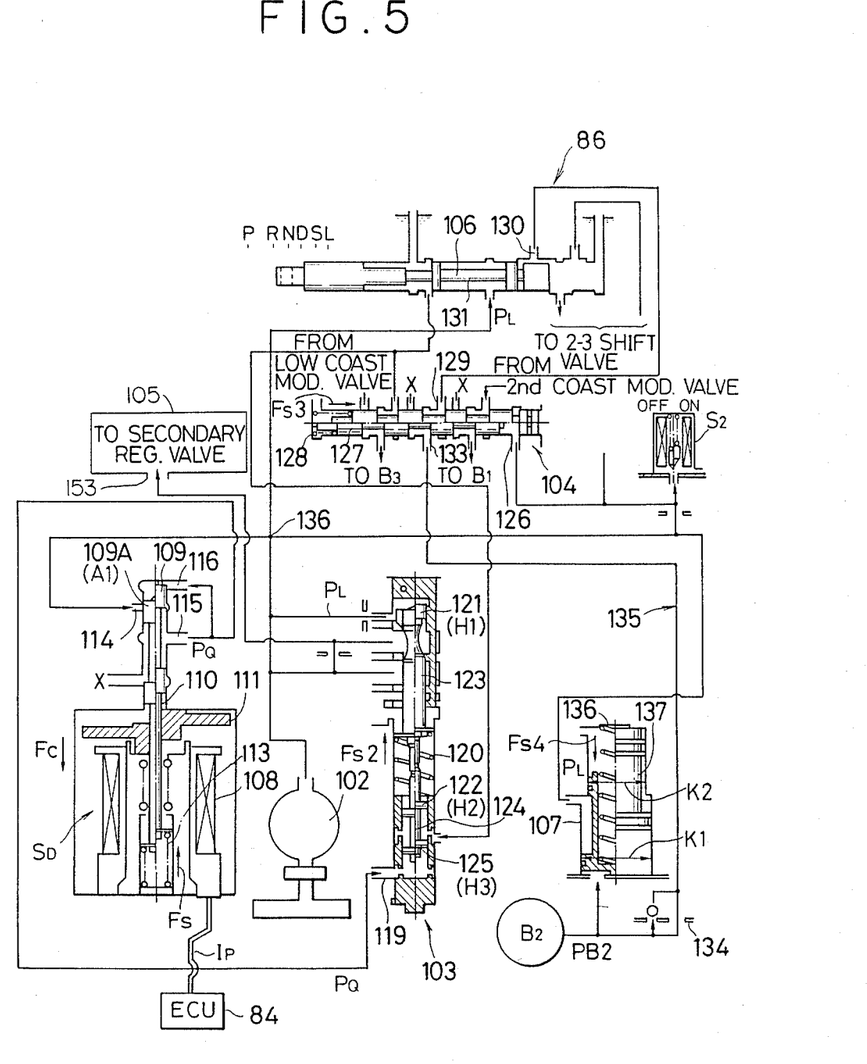
FIG. 5 is a hydraulic circuit diagram showing the essential portions of the hydraulic control device.

FIG. 5 shows the essential portions of the hydraulic control device 86.

In the drawing, denoted at SD is the electromagnetic proportion valve, at 102 is a pump directly connected to the engine, at 103 is the primary regulator valve for regulating the line pressure, at 104 a 1-2 shift valve for changing over between a first gear stage and second gear stage, at S2 is the solenoid valve for controlling the 1-2 shift valve, at 105 is a secondary regulator valve for supplying the lubricating oil, at 106 is a manual valve operated by the driver and at 107 is an accumulator for controlling the transition characteristics when the oil pressure is supplied to or removed from the brake B2, respectively.

The electromagnetic proportion valve SD is well known by itself and includes spools 109 and 110, coil 108, spring 113, plunger 111 and the like. The spool 110 and the plunger 111 are interconnected in the axial direction. The coil 108 applies a force Fc directed downwardly in the drawing to the plunger 111 (and the spool 110) in accordance with load current Ip from the ECU 84. On opposition to the force Fc, the spring 113 renders a force Fs to the spool 110. A discharge pressure from the pump 102 acts on a port 109A. The oil pressure at ports 115 and 116 is designated PQ. PQ is derived through the following equation (1), wherein A1 is the surface area of land 109A of spool 109.

$$PQ = (Fs - Fc)/A1 \quad (1)$$

As a consequence, the force Fc directed downwardly in the drawing, which is generated by the coil 108, is controlled, so that the oil pressure PQ generated at the port 115 in accordance with equation (1) can be controlled to a desirable value ranging from zero to Fs/A1. Oil pressure PQ corresponds to a so-called throttle pressure which has heretofore been normally generated by a throttle valve, wherein a spool is mechanically drivable through a cam in proportion to a throttle opening. Oil pressure PQ acts on a port 119 of a primary regulator valve 103 to control the line pressure. Oil pressure PQ also acts on a port 153 of a secondary regulator valve 105 to control the lubricating oil pressure.

In the primary regulator valve 103, the line pressure PL is generated in relation to the value of the control pressure PQ, as is conventional. Because the load current Ip to the coil 108 is controlled in response to a command from the ECU 84, the line pressure PL can be desirably controlled. The equation relating to the pressure regulation in the primary regulator valve 103 is as follows:

$$PL = \{Fs2 + (H2 - H3)PR + H2\}PQ/H1 \quad (2);$$

wherein Fs2 is the acting force of a spring 120, H1–H3 are face areas of lands 121, 122 and 125 of spools 123 and 124, and PR is the line pressure applied to the lands 122 and 125 when the manual valve 106 is in the reverse range.

The frictionally engaging devices are described below. The brake B2 will be described as typifying the frictionally engaging devices.

A signal pressure of the solenoid valve S2 acts on port 126 of the 1-2 shift valve 104. As a consequence, a spool 127 of the 1-2 shift valve 104 slides to the right and left in the drawing in accordance with the ON-OFF operation of the solenoid valve S2. Spool 127 is biased to the right due to the force Fs3 from a spring 128. When spool 121 is in its rightward position, ports 133 and 129 in the 1-2 shift valve 104 communicate with one another. The line pressure PL from a port 130 of the manual valve 106 acts on the port 129 in the D (drive) range. More specifically, the ports 130, 129 and 133 are adapted to be connected to one another in the D range selection position of the spool 131 of the manual valve 106. The port 133 is connected to the brake B2 through an oil line 135 and a check valve 134. As a consequence, in the D range, the line pressure PL is supplied to or removed from the brake B2 in accordance with the ON-OFF operation of the solenoid valve S2.

The oil line 135 is connected with accumulator 107, whereby the transitional oil pressure level is controlled when the line pressure PL is supplied to or removed from the brake B2. The transitional oil pressure PB2, i.e., the oil pressure while the accumulator 107 is working, is derivable as a function of the line pressure PL applied as the back pressure as indicated by the following equation.

$$PB2 = Fs4 + (K1 - K2)PL/K1 \quad (3);$$

wherein Fs4 is an acting force of a spring 135, and K1 and K2 are face areas of two lands of an accumulator piston 137.

Because the control oil pressure PQ is controlled by the load current control to the electromagnetic proportion valve SD through the above-described equations (1)–(3), the oil pressure PB2 to the brake B2 can be derivably controlled at transitional times, as well as other times.

Figure 6:
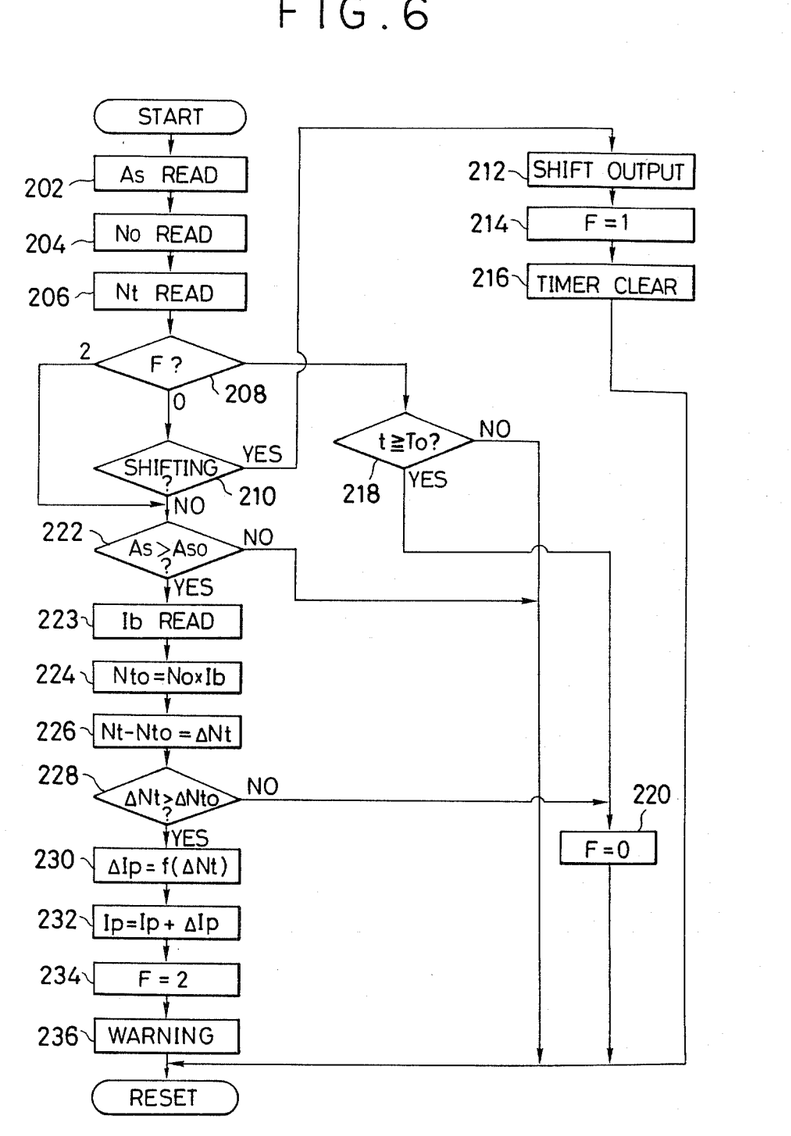
FIG. 6 is a flow chart showing a control routine.

FIG. 6 shows the control flow chart for above embodiment.

In Steps 202-206, a throttle opening As, rotary speed No of the output shaft 70 (corresponding to vehicle speed) and rotary speed Nt of the turbine shaft 22A are read in, respectively. Denoted at F in Step 208 is a flag for controlling the flow. Since the flag F is set at zero initially, the routine proceeds to Step 210, where the occurrence of shift judgment is discriminated. When a shift judgment occurs, the routine proceeds to Step 212, where a shift output is carried out, the flag F is set to 1 in Step 214, a timer t is cleared (started) in Step 216, and thereafter, reset is made.

Thereafter, the routine proceeds to Steps 202-208 again, and since F=1, in Step 218, judgment is made as to whether a prescribed period of time TO from the timer start in Step 216 has elapsed or not. TO is selected to represent the minimum amount of time which must elapse between a shift judgment or a shift command and the determination of a correlation between the output shaft rotary speed No and the turbine shaft rotary speed Nt. Until a passage of time t reaches the prescribed time TO, reset is maintained and judgment for the failsafe is not performed. When it is judged that the passage of time t has reached the prescribed time TO, the flag F is set to zero again in Step 220, and thereafter, reset is made. The reason why the prescribed period of time TO from the shift command is excluded from the period of time of judgment for a failsafe as described above resides in that the correlation (to be described hereunder) need not necessarily be established.

On the other hand, when no shifting is judged in Step 210, it is discriminated whether a throttle opening As is higher than a predetermined value Aso or not in Step 222. This is intended for discriminating whether the engine brake is operating or not, and, when the engine brake is operating (so-called coasting conditions), the correlation is not necessarily be established in a certain gear stage because a one-way clutch becomes free. When the throttle opening As is lower than the predetermined value Aso in Step 222, reset is made. When the throttle opening As is higher than the predetermined value Aso, the routine proceeds to Step 223, 224, where a calculated turbine shaft rotary speed Nto is calculated by multiplying the output shaft rotary speed No by the gear ratio Ib of the present gear stage. Subsequently, in Step 226, a correlation difference ΔNt is calculated by subtracting the calculated turbine shaft rotary speed Nto from an actual turbine shaft rotary speed Nt.

In Step 228, judgment is made as to whether this correlation difference ΔNt is larger than the predetermined value ΔNto or not. When the correlation difference ΔNt is smaller than the predetermined value ΔNto, it is regarded that the frictionally engaging devices are functioning normaly by the sufficient oil pressure, whereby, in Step 220, the flag F is set to zero, and thereafter, reset is made.

On the other hand, when it is judged that the correlation difference Δt is larger than the predetermined value ΔNto, it is regarded that slips are generated in the frictionally engaging devices, whereby, in Step 230, a corrected current value ΔIp is determined in accordance with the correlation difference ΔNt, current correction is made in Step 232, thereafter, in Step 234, the flag F is set to 2, and a warning is issued in Step 236.

Figure 7:
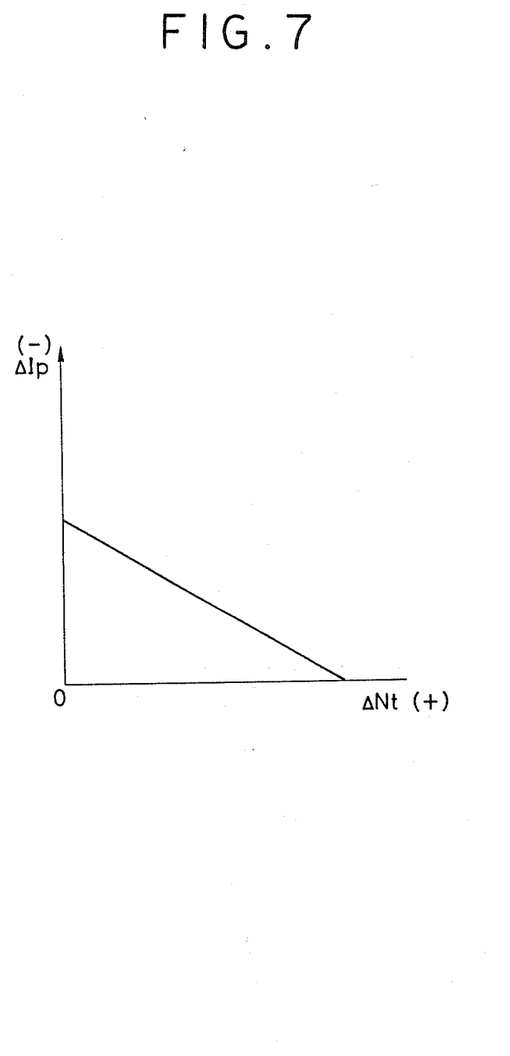
FIG. 7 is a chart showing the relationship between a correlation difference $\Delta Nt$ and a corrected current value $\Delta Ip$ of the electromagnetic proportion valve.

After the flag F is set to 2 in Step 234, the routine proceeds from Step 202-208 to Step 222, and check is repeated again. As a result, this failsafe function is performed, having priority to shift output based on the shift judgment. Additionally, FIG. 7 shows the relationship between the correlation difference ΔNt and the correction current value ΔIp in Step 230.

Needless to say, it should be an effective means to apply this correction current value ΔIp as an offset value even at the time of shifting.

Figure 8:
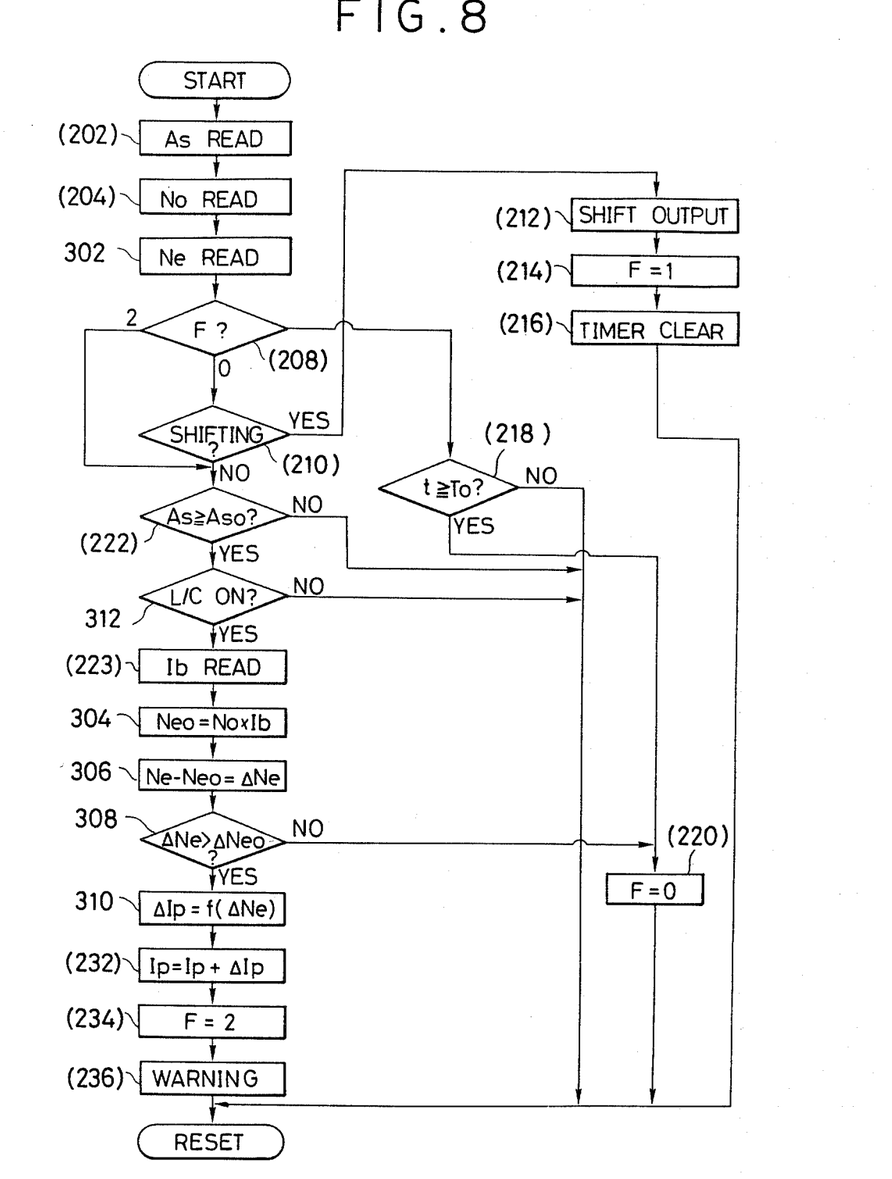
FIG. 8 is a flow chart showing an example of another control routine.

FIG. 8 shows and example of another control flow. This control flow is different from the preceding control flow in that subjects to be detected for determining the correlation include the output shaft rotary speed No and the engine rotary speed Ne. Along with this, in Step 302, in place of the turbine shaft rotary speed Nt, the engine rotary speed Ne is monitored, Nto, Nt, ΔNt, ΔNto are replaced by Neo, Ne, ΔNe and ΔNeo, in Steps 304, 306, 308 and 310, respectively, and, Step 312 is added after Step 222, so that ON or OFF of the lockup clutch 24 is judged. This is because, when the engine rotary speed Ne is selected as the subject for determining the correlation, if the lockup clutch 24 is OFF, then it is difficult to determine the correlation.

Figure 9:
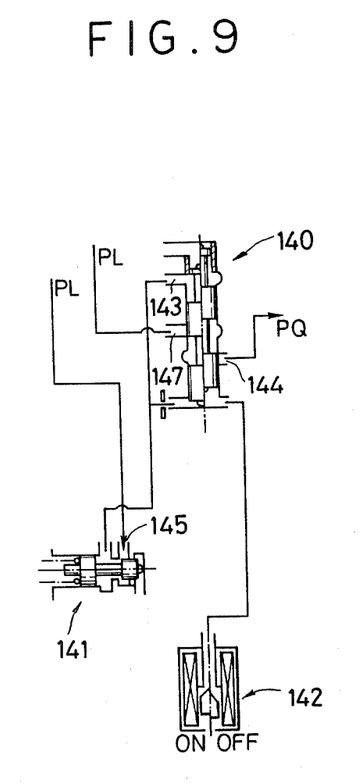
FIG. 9 is a hydraulic circuit diagram showing the essential portions of a hydraulic control device to explain another means for changing the line pressure.

The above embodiment controls the oil pressure by the combination of an electromagnetic proportion valve with a primary regulator valve. However, the present disclosed invention is not so limited, and may encompass further control systems for controlling oil pressure. For example, as shown in the further embodiment of FIG. 9, in place of the electromagnetic proportion valve, a relief valve 141, a duty control valve 140 and a high speed solenoid valve 142 are provided. The duty ratio of the high speed solenoid valve 142 may be controlled to desirably regulate the line pressure applied to a port 147 of the duty control valve 140 with the control oil pressure PQ at a port 144. In this embodiment, port 147 is connected to oil line point 136 shown in FIG. 5, the port 144 is connected to port 119 of the primary regulator valve 103, and further, a port 145 of the relief valve 141 is connected to the oil line point 136. The regulation of pressure by such duty ratio controls are disclosed the disclosures of Japanese Utility Model Application Publication No. 38186/1983, Patent Kokai (Laid-Open) No. 24246/1981 and the like, which disclosures are well known, and expressly incorporated herein by reference.

Furthermore, it is applicable embodiment that only when the correlation is shifted larger than the predetermined value for a predetermined period of time, the correlation should be judged to be abnormal. With this arrangement, such a misjudgment that an instantaneous shift in the correlation is erroneously attributed to the slips of the frictionally engaging devices can be avoided.

What is claimed is:

1. A failsafe system in an automatic transmission for a vehicle, comprising:
    means for detecting an output shaft rotary speed of said automatic transmission;
    means for detecting engine rotary speed;
    means for detecting engine load;
    means for detecting whether a lockup clutch of said automatic transmission is engaged;
    means for detecting whether a prescribed period of time has elapsed from either a shift judgment or a shift command of said automatic transmission;
    means for determining a correlation between said output shaft rotary speed and said engine rotary speed when said engine load is higher than a predetermined value, said lockup clutch is engaged, and said prescribed period of time has elapsed from either of said shift judgment or shift command of said automatic transmission;
    means for judging whether said correlation is abnormal; and
    means for increasing oil pressure in a hydraulic control device of said automatic transmission when said correlation is judged to be abnormal.

2. The failsafe system as set forth in claim 1, wherein said oil pressure in the hydraulic control device is line pressure.

3. The failsafe system as set forth in claim 1, further comprising:
    an electromagnetic proportion valve; wherein said oil pressure in the hydraulic control device is increased by the control of said electromagnetic proportion valve.

4. The failsafe system as set forth in claim 1, further comprising:
    a duty valve; wherein said oil pressure in the hydraulic control device is increased by the duty control of said duty valve.

5. The failsafe system as set forth in claim 1, further comprising:
    means for judging whether said correlation is shifted more than a predetermined value; wherein said judging means judges said correlation is abnormal when said correlation is shifted more than said predetermined value.

6. The failsafe system as set forth in claim 1, further comprising:
   means for judging whether said correlation is shifted more than a predetermined value for a predetermined period of time; wherein said judging means judges said correlation is abnormal when said correlation is shifted more than said predetermined value for a predetermined period of time.

7. The failsafe system as set forth in claim 1, further comprising:
   a warning device; wherein, when said correlation is judged to be abnormal, a warning is issued from said warning device.

8. A failsafe system in an automatic transmission for a vehicle, comprising:
   means for detecting rotary speed of an output shaft of said automatic transmission;
   means for detecting rotary speed of a turbine shaft of said automatic transmission;
   means for detecting engine load;
   means for detecting whether a prescribed period of time has elapsed from either a shift judgment or a shift command of said automatic transmission;
   means for determining a correlation between the rotary speed of the output shaft and the rotary speed of the turbine shaft when said engine load is higher than a predetermined value, and said prescribed period of time has elapsed from either of said shift judgment or shift command of said automatic transmission;
   means for judging whether said correlation is abnormal; and
   means for increasing oil pressure in a hydraulic control device of said automatic transmission when said correlation is judged to be abnormal.

* * * * *